(12) United States Patent
Lambert et al.

(10) Patent No.: US 12,227,372 B2
(45) Date of Patent: Feb. 18, 2025

(54) LOADING GRANULAR MATERIALS FROM A TRANSPORT TRUCK INTO A STORAGE SYSTEM

(71) Applicant: SOLARIS OILFIELD SITE SERVICES OPERATING LLC, Houston, TX (US)

(72) Inventors: Bryan Scott Lambert, The Woodlands, TX (US); Whitney Jordan Salinas, Brownwood, TX (US); William Vaughn Managan, II, Rochelle, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 394 days.

(21) Appl. No.: 17/715,599

(22) Filed: Apr. 7, 2022

(65) Prior Publication Data

US 2022/0324660 A1 Oct. 13, 2022

Related U.S. Application Data

(60) Provisional application No. 63/172,422, filed on Apr. 8, 2021.

(51) Int. Cl.
| | |
|---|---|
| *B65G 53/66* | (2006.01) |
| *B65G 3/04* | (2006.01) |
| *B65G 33/14* | (2006.01) |
| *B65G 53/08* | (2006.01) |
| *B65G 67/24* | (2006.01) |

(52) U.S. Cl.
CPC ............... *B65G 53/66* (2013.01); *B65G 3/04* (2013.01); *B65G 33/14* (2013.01); *B65G 53/08* (2013.01); *B65G 67/24* (2013.01); *B65G 2201/042* (2013.01)

(58) Field of Classification Search
None
See application file for complete search history.

(56) References Cited

U.S. PATENT DOCUMENTS

| | | | | |
|---|---|---|---|---|
| 3,602,552 A * | 8/1971 | Morgan | .................. | B65G 53/08 406/60 |
| 4,391,561 A * | 7/1983 | Smith | ..................... | B65G 53/48 406/61 |
| 4,711,607 A * | 12/1987 | Wynosky | ............... | B65G 53/08 406/61 |

* cited by examiner

*Primary Examiner* — William R Harp
(74) *Attorney, Agent, or Firm* — MH2 Technology Law Group, LLP

(57) ABSTRACT

A system includes a pump configured to transfer a granular material out of a hopper into a transfer pipe. The pump includes an upstream portion having an upstream helical flight and a downstream portion having a downstream helical flight. The downstream portion includes a tailpiece. An outer diameter of the downstream helical flight is less than an outer diameter of the upstream helical flight, a gap between the outer diameter of the downstream helical flight and an auger housing is greater than a gap between the outer diameter of the upstream helical flight and the auger housing, a thickness of the downstream helical flight is less than a thickness of the upstream helical flight, a surface of the downstream portion has a lesser coefficient of friction than a surface of the upstream portion, or a combination thereof.

19 Claims, 5 Drawing Sheets

LOADING GRANULAR MATERIALS FROM A TRANSPORT TRUCK INTO A STORAGE SYSTEM

CROSS-REFERENCE TO RELATED APPLICATIONS

This application claims priority to U.S. Provisional Patent Application No. 63/172,422, filed on Apr. 8, 2021, the entirety of which is incorporated by reference herein.

BACKGROUND

Granular material (e.g., sand) may be used in bulk quantities in a number of applications. For example, mining companies sometimes make use of a technique termed "hydraulic fracturing" to aid in the extraction of fossil fuels from well sites. Hydraulic fracturing is the propagation of fractures in a rock layer caused by the presence of a pressurized fluid.

Trucks (e.g., tractor trailer rigs) are typically used to transport this granular material to a well site. However, if there is not an efficient way to unload the granular material at the well site, the trucks may be forced to wait on site until the granular material is ready to be used. As will be appreciated, this may be time-consuming and expensive. Therefore, what is needed is an improved system and method for unloading and storing granular material at a well site.

SUMMARY

A system for transporting and storing a granular material is disclosed. The system includes a conveyor configured to transfer the granular material from a truck into a hopper. The system also includes a pump configured to transfer the granular material out of the hopper into a transfer pipe. The pump includes an upstream portion having an upstream helical flight and a downstream portion having a downstream helical flight. An outer diameter of the downstream helical flight is from about 0.01 inches to about 0.10 inches less than an outer diameter of the upstream helical flight. A gap between the outer diameter of the downstream helical flight and an auger housing is from about 0.01 inches to about 0.10 inches greater than a gap between the outer diameter of the upstream helical flight and the auger housing. A thickness of the downstream helical flight is from about 0.05 inches to about 0.40 inches less than a thickness of the upstream helical flight. A surface of the downstream portion has a lesser coefficient of friction than a surface of the upstream portion. The system also includes a speed sensor configured to measure a speed of the pump. The system also includes a blower configured to generate pressurized air that moves the granular material within the transfer pipe. The system also includes a pressure sensor configured to measure a pressure of the pressurized air. The system also includes a silo configured to receive the granular material from the transfer pipe. The system also includes a computing system configured to receive the measured speed and measured pressure. The computing system is also configured to maintain or increase the speed of the pump in response to the measured pressure being within a predetermined range. The computing system is also configured to increase the speed of the pump in response to the measured pressure exceeding the predetermined range. The computing system is also configured to decrease the speed of the pump in response to the measured pressure falling below the predetermined range.

In another embodiment, the system includes a pump configured to transfer a granular material out of a hopper into a transfer pipe. The pump includes an upstream portion having an upstream helical flight and a downstream portion having a downstream helical flight. The downstream portion includes a tailpiece. An outer diameter of the downstream helical flight is less than an outer diameter of the upstream helical flight, a gap between the outer diameter of the downstream helical flight and an auger housing is greater than a gap between the outer diameter of the upstream helical flight and the auger housing, a thickness of the downstream helical flight is less than a thickness of the upstream helical flight, a surface of the downstream portion has a lesser coefficient of friction than a surface of the upstream portion, or a combination thereof.

A method for transporting and storing a granular material is also disclosed. The method includes transferring the granular material from a truck into a hopper. The method also includes transferring the granular material from the hopper into a transfer pipe using a pump. The method also includes moving the granular material through the transfer pipe and into a silo using a blower. The blower generates a pressurized gas to move the granular material. The method also includes measuring a pressure of a pressurized gas using a pressure sensor. The method also includes varying a speed of the pump based at least partially upon the measured pressure.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
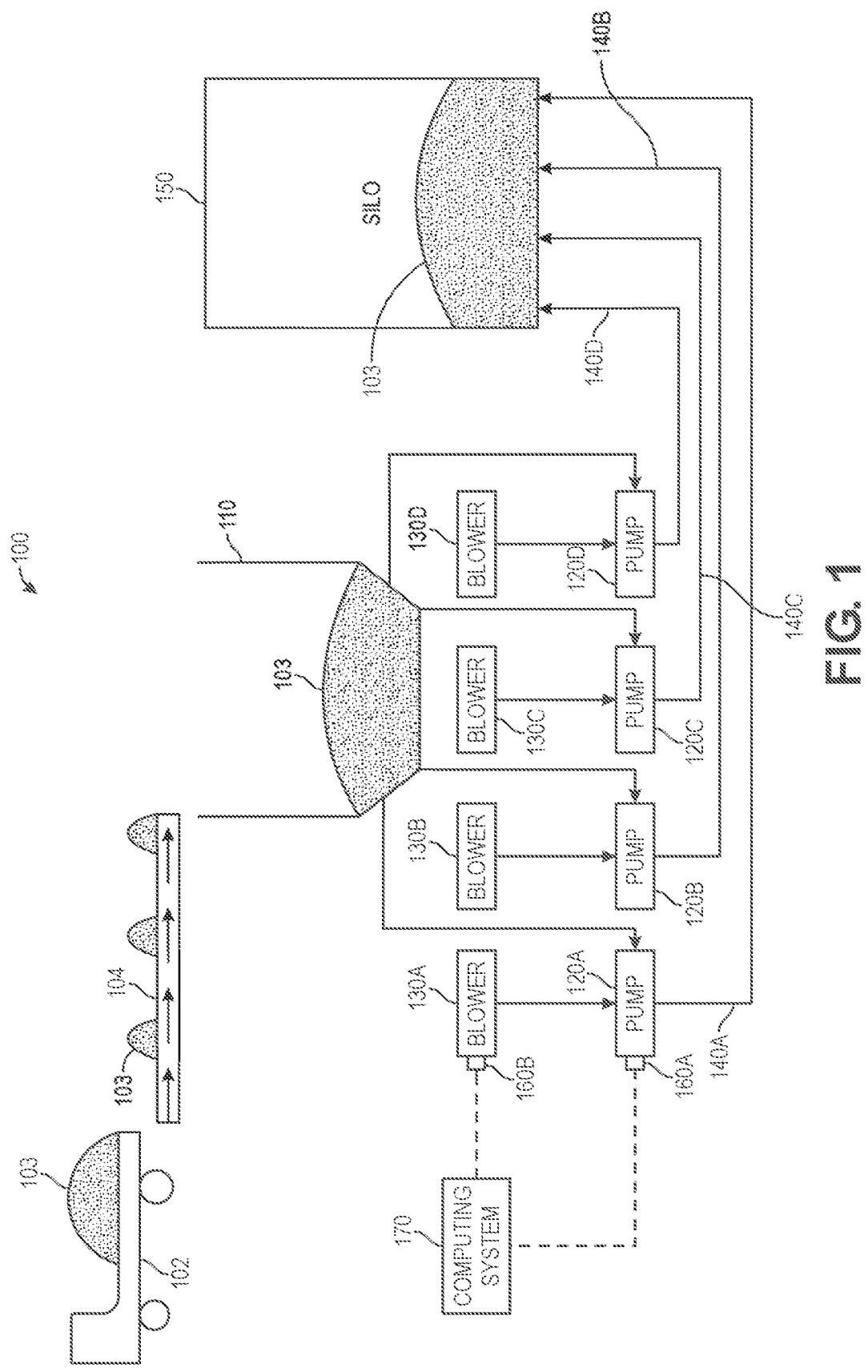
FIG. 1 illustrates a schematic view of a system for transporting and storing granular material, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a schematic view of a system 100 for transporting and storing granular material 103, according to an embodiment. The system 100 may be located at a well site. The system 100 may be configured to receive a truck 102 (i.e., the truck 102 may drive to the well site). The truck 102 may be or include a tractor trailer rig/bed that is configured to store and/or transport granular material 103. The granular material 103 may include particles having an average cross-sectional length that is less than about 1 cm, less than about 5 mm, less than about 1 mm, or less than about 0.5 mm. For example, the granular material 103 may be or include sand and/or ceramic proppant.

The system 100 may include a conveyor 104. A first end of the conveyor 104 may be coupled to and/or positioned at least partially under the truck 102, such that the granular material 103 may be transferred (e.g., dumped via gravity) onto the conveyor 104.

The system 100 may also include a hopper (also referred to as a tank) 110. The hopper 110 may be coupled to and/or downstream from the conveyor 104. A second end of the conveyor 104 may be positioned at least partially above the hopper 110. The conveyor 104 may be configured to convey the granular material 103 from the truck 102 into the hopper 110. In one embodiment, the conveyor 104 may include a belt that circulates around a track. In another embodiment, the conveyor 104 may be pneumatic, and a negative pressure within the hopper 110 may pull the granular material 103 from the truck 102, through the conveyor 104, and into the hopper 110.

The system 100 may also include one or more pumps (four are shown: 120A-120D). The pumps 120A-120D may be coupled to and/or downstream from the hopper 110. The pumps 120A-120D may be or include screw pumps. The pumps 120A-120D may transfer the granular material 103 from the hopper 110 into transfer pipes 140A-140D.

The system 100 may also include one or more blowers (four are shown: 130A-130D). The blowers 130A-130D may be coupled to the pumps 120A-120D and/or the transfer pipes 140A-140D. The blowers 130A-130D may be positioned upstream from the pumps 120A-120D and/or the transfer pipes 140A-140D. The blowers 130A-130D may be configured to blow gas (e.g., air) into the pumps 120A-120D and/or the transfer pipes 140A-140D to move the granular material 103 within the pumps 120A-120D and/or the transfer pipes 140A-140D.

The system 100 may also include a silo 150. The silo 150 may be coupled to and/or downstream from the transfer pipes 140A-140D. The granular material 103 may flow through the transfer pipes 140A-140D into the silo 150, where it may be stored until it is needed (e.g., for hydraulic fracturing operations) at the well site.

The system 100 may also include one or more sensors (two are shown: 160A, 160B). The first sensor(s) 160A may be or include speed sensors that may be coupled to the pumps 120A-120D. The speed sensors 160A may be configured to measure the speed of the pumps 120A-120D (e.g., the rate at which an auger in each pump rotates). The second sensor(s) 160B may be or include pressure sensors that may be coupled to the pumps 120A-120D, the blowers 130A-130D, and/or the transfer pipes 140A-140D. The pressure sensors 160B may be configured to measure the pressure of the gas (e.g., air) in the pumps 120A-120D, the blowers 130A-130D, and/or the transfer pipes 140A-140D. As will be appreciated, the pressure may increase as the amount of granular material 103 in the pumps 120A-120D and/or the transfer pipes 140A-140D increases, and the pressure may decrease as the amount of granular material 103 in the pumps 120A-120D and/or the transfer pipes 140A-140D decreases.

The system 100 may also include a computing system 170. The computing system 170 may be configured to receive measured data from the sensors 160A, 160B. The computing system 170 may also be configured to control the speed of the pumps 120A-120D based at least partially upon the measured pressure (e.g., from the sensors 160B) and/or a target pressure, as discussed in greater detail below.

Figure 2:
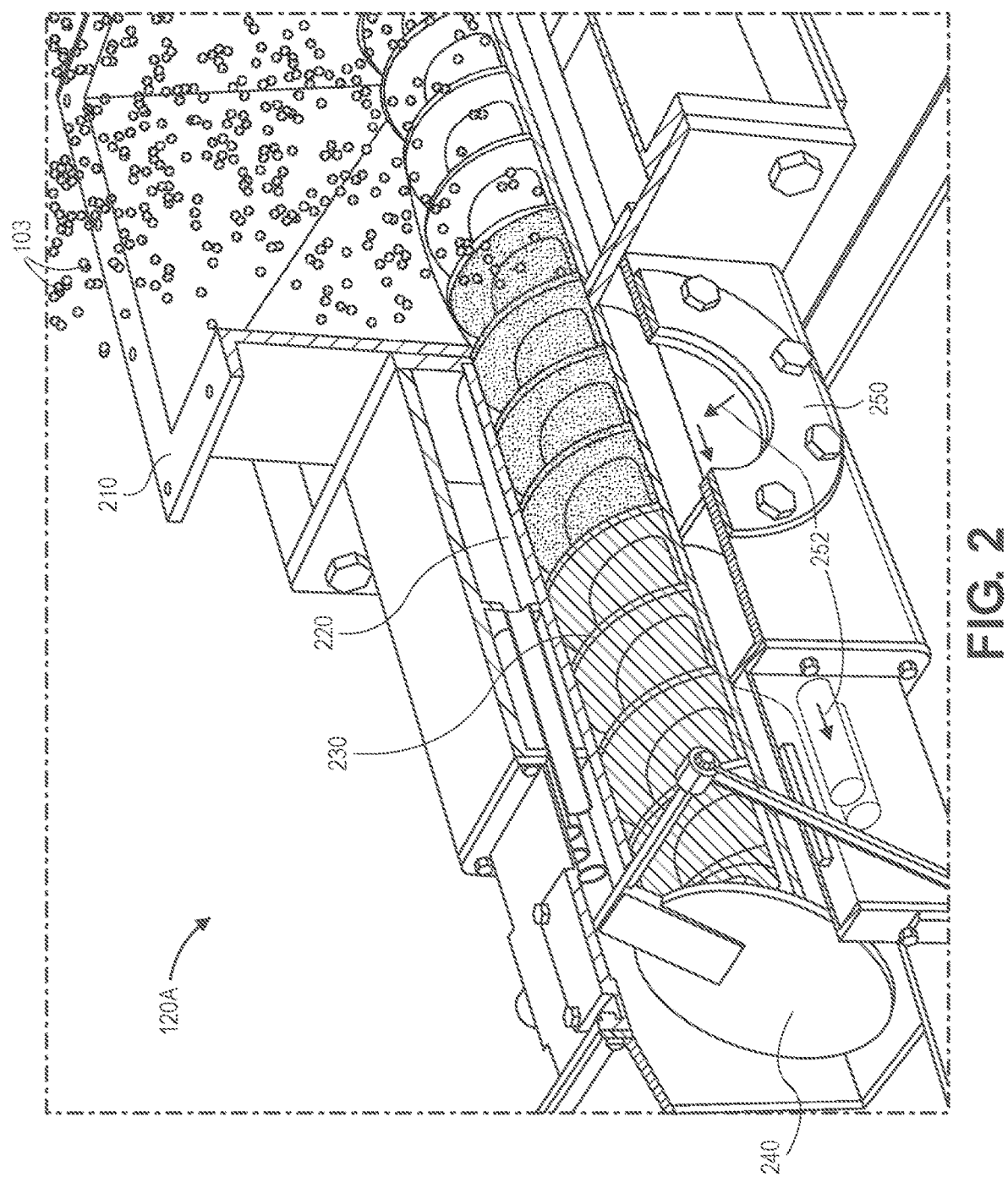
FIG. 2 illustrates a cross-sectional perspective view of a portion of the system (e.g., a pump), according to an embodiment.

FIG. 2 illustrates a cross-sectional perspective view of a portion of the pump 120A, according to an embodiment. The other pumps 120B-120D may be the same as, or different from, the pump 120A. The pump 120A may include a granular material inlet 210 that is coupled to and/or positioned below the hopper 110. As may be seen, the granular material 103 may be transferred into the pump 120A via the granular material inlet 210.

The pump 120A may also include an auger housing 220 that is in communication with the granular material inlet 210. An auger 230 may be positioned at least partially within the auger housing 220. The auger 230 may be configured to rotate within the auger housing 220, which may push the granular material 103 through the auger housing 220 in the downstream direction (e.g., to the left in FIG. 2).

The pump 120A may also include a valve (e.g., a flap) 240 that is coupled to the downstream end of the auger housing 220. The valve 240 may be configured to actuate from a first (e.g., closed) position into a second (e.g., open) position. In the closed position, the granular material 103 may be prevented from flowing downstream therethrough. In the open position, the granular material may be permitted to flow downstream therethrough (e.g., into the transfer pipe 140A).

The pump 120A may also include a gas inlet 250. Gas (e.g., air) from the blower 130A (see FIG. 1) may flow through the gas inlet 250 as shown by the arrows 252 and be combined with the granular material 103 within the pump 120A (e.g., downstream from the valve 240). The flowing gas may help to carry the granular material 103 out of the pump 120A, into and through the transfer pipe 140A, and into the silo 150.

Modifications to the Auger

Figure 3:
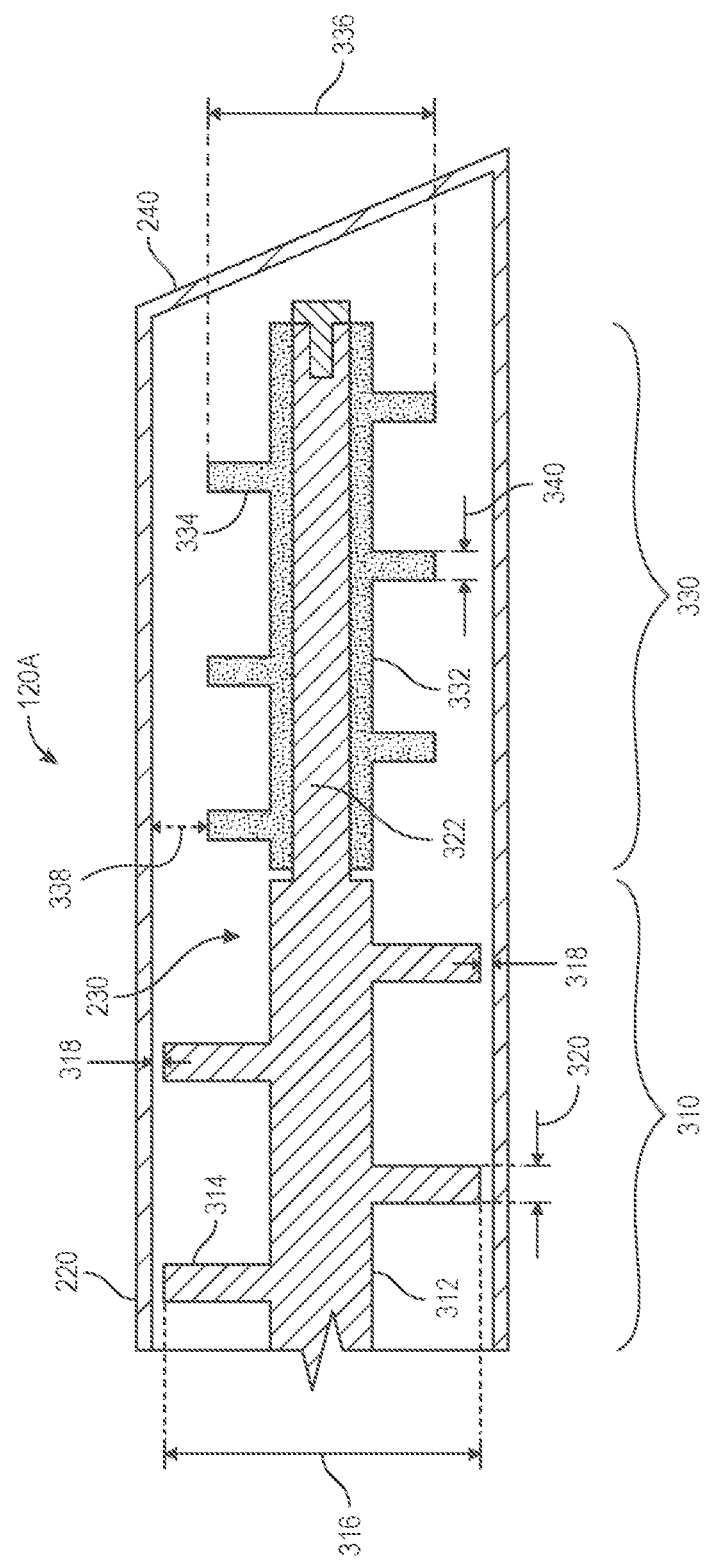
FIG. 3 illustrates a cross-sectional side view of a portion of the pump, according to an embodiment.

FIG. 3 illustrates a cross-sectional side view of a portion of the pump 120A, according to an embodiment. The auger 230 may include a first (e.g., upstream) portion 310 and a second (e.g., downstream) portion (also referred to as a tailpiece) 330. The first portion 310 may include a first portion body 312 and one or more (e.g., helical) flight(s) 314 that is/are coupled to or integral with the first portion body 312. The flight(s) 314 may extend radially outward from the first portion body 312. The flight(s) 314 may include an outer diameter 316 from about 4.870 inches to about 4.924 inches. As a result, a gap 318 between the inner surface of the auger housing 220 and the outer surface of the flight(s) 314 may be from about 0.076 inches to about 0.130 inches. A thickness 320 of the flight(s) 314 may be from about 0.30 inches to about 0.60 inches, about 0.35 inches to about 0.55 inches, or about 0.40 inches to about 0.50 inches. In addition, the outer surface of the first portion body 312 and/or the flight(s) 314 may be relatively rough and/or have a relatively high coefficient of friction.

The first portion body 312 may also include a shaft 322 that is coupled to or integral with the first portion body 312. The shaft 322 may extend axially from the first portion body 312 (e.g., in the downstream direction). The second portion (i.e., the tailpiece) 330 may be positioned at least partially on and/or around the shaft 322. The second portion 330 may include a second portion body 332 and one or more (e.g., helical) flight(s) 334 that is/are coupled to or integral with the second portion body 332. The flight(s) 334 may extend radially outward from the second portion body 332. The flight(s) 334 may include an outer diameter 336 that is from about 4.719 inches to about 4.813 inches. Thus, the outer diameter 336 may be from about 0.06 inches to about 0.15 inches or from about 0.11 inches to about 0.21 inches less than the outer diameter 316. As a result, a gap 338 between the inner surface of the auger housing 220 and the outer surface of the flight(s) 334 may be from about 0.188 inches to about 0.281 inches. The gap 338 may be from about 0.06 inches to about 0.15 inches or from about 0.11 inches to about 0.21 inches greater the gap 318. A thickness 340 of the flight(s) 334 may be from about 0.10 inches to about 0.40 inches, about 0.15 inches to about 0.35 inches, or about 0.20 inches to about 0.30 inches. The thickness 340 may be from about 0.188 inches to about 0.313 inches or from about 0.15 inches to about 0.30 inches less than the thickness 320. In addition, the outer surface of the second portion body 332 and/or the flight(s) 334 may be relatively smooth and/or have a relatively low coefficient of friction (e.g., compared to the first portion body 312 and/or the flight(s) 314).

A conventional second portion (i.e., tailpiece) may have the same diameter, gap, thickness, and coefficient of friction as the first portion. However, this may result in the conventional second portion (i.e., tailpiece) having difficulty transferring of the granular material 103 through the pump 120A as the auger 230 rotates. Applicant has discovered that manufacturing or modifying the second portion (i.e., tailpiece 330) to have a different diameter 336, a different gap 338, a different thickness 340, and/or a different coefficient of friction from the first portion 310 may improve the transfer of the granular material 103 through the pump 120A as the auger 230 rotates. More particularly, these modifications have resulted in an increase in throughput through the system 100 by reducing downtime.

Controlling the Pumps

The system 100 may be able to control the pumps 120A-120D based at least partially upon the measured pressure to optimize the flow of the granular material 103 through the pumps 120A-120D. More particularly, the computing system 170 may be configured to increase, decrease, and/or maintain the speed at which the augers 230 rotate in the pumps 120A-120D, based at least partially upon the comparison of the measured pressure with a target pressure, to optimize the flow of the granular material 103 through the pumps 120A-120D and transfer pipes 140A-140D and into the silo 150.

The computing system 170 may control the pumps 120A-120D to prevent (or minimize an amount of time that) the measured pressure exceeds the target pressure. The computing system 170 may also control the pumps 120A-120D to prevent the acceleration and/or deceleration of the pumps 120A-120D from exceeding a predetermined acceleration threshold, which could cause the granular material 103 to form a bridge around the outside of the flights 314, 334 instead of falling into the cavities between the flights 314, 334.

When the system 100 is turned on, the pumps 120A-120D may ramp up to an initial (e.g., baseline) speed. In an example, the baseline speed may be about 1800 RPM. The baseline speed may be sufficient to allow the augers 230 to have sufficient power/speed to rotate under a load of the granular material 103. The speed sensors 160A may measure the speed 410 of the pumps 120A-120D. In addition, when the system 100 is turned on, the system 100 may cause the blowers 130A-130D to ramp up to a constant speed. The speed of the blowers 130A-130B may be from about 2500 RPM to about 3000 RPM (e.g., about 2700 RPM), which may decrease air pressure and/or increase the flow of granular material 103. The pressure sensors 160B may measure the pressure of the gas (e.g., air) in the blowers 130A-130D. The pressure may also or instead be measured in the pumps 120A-120D and/or in the transfer pipes 140A-140D.

The measured speed and pressure may be transmitted to the computing system 170. The computing system 170 may compare the measured pressure with the target pressure. The target pressure may be manually selected by a user, automatically selected by the computing system 170, or provided by the manufacturer of the blowers 130A-130D. In an example, the target pressure may be about 12 PSI.

Figure 4:
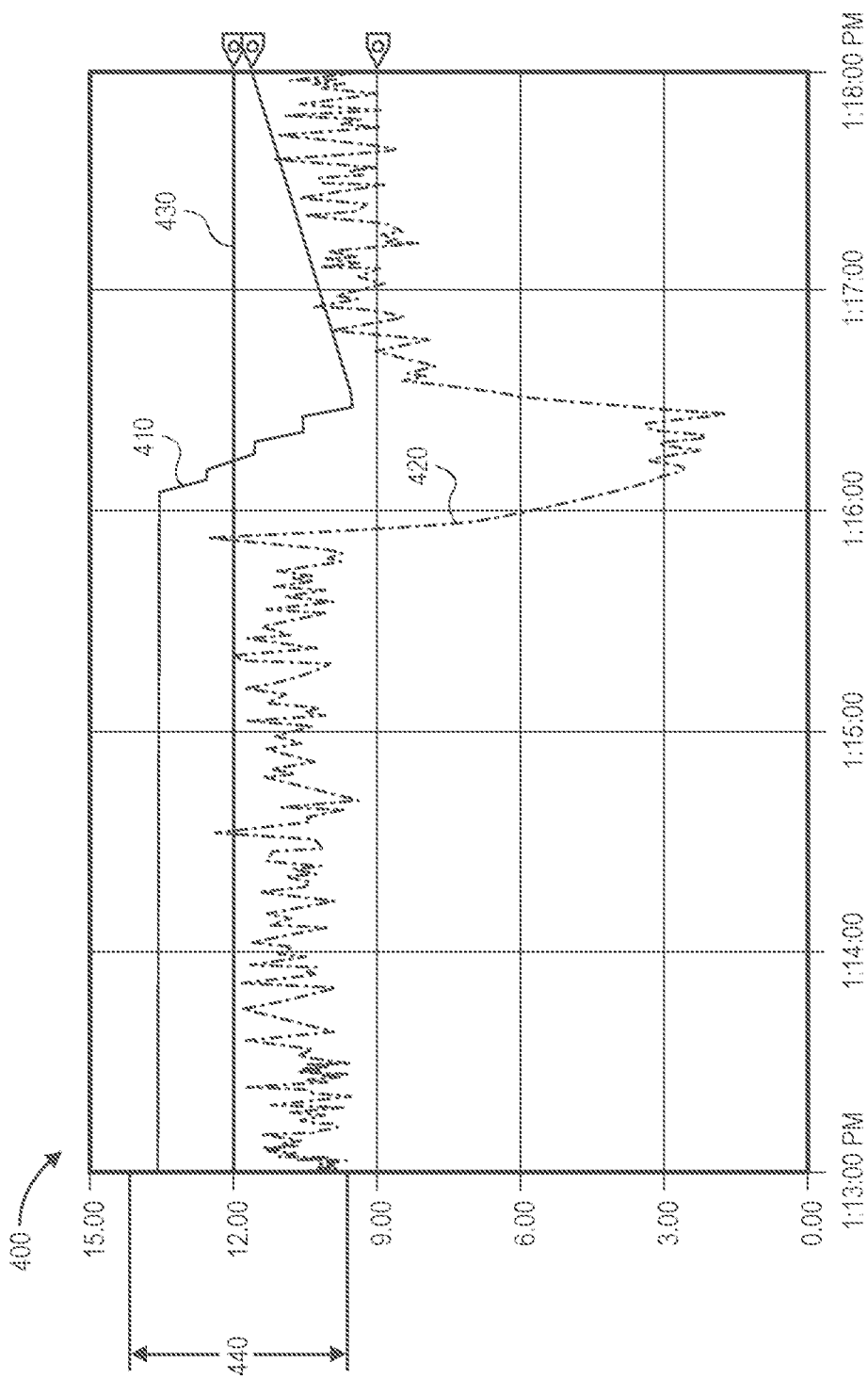
FIG. 4 illustrates a graph showing a measured speed of the pump, a measured pressure of a blower, a target pressure for the blower, and a target pressure range for the blower, according to an embodiment.

FIG. 4 illustrates a graph 400 showing the speed of the pumps 120A-120D (as measured by the speed sensors 160A), the pressure of the blowers 130A-130D (as measured by the pressure sensors 160B), and a target pressure, according to an embodiment. The graph 400 shows a timeframe after the system 100 has been turned on (i.e., the ramp-up is not shown). Reference number 410 represents the speed of the pumps 120A-120D, reference number 420 represents the pressure of the blowers 130A-130D, reference number 430 represents the target pressure, and reference number 440 represents a target pressure range. The target pressure range 440 may be based upon the target pressure 430. For example, the target pressure 430 may be within (e.g., a midpoint of) the target pressure range 440. In an example, the target pressure range 440 may be from about 11 PSI to about 13 PSI.

The computing system 170 may determine that the measured pressure 420 is within the predetermined pressure range 440. In response to determining that the measured pressure 420 is within the predetermined pressure range 440, the computing system 170 may maintain or increase the speed of the pumps 120A-120D. Increasing the speed of the pumps 120A-120D may increase (e.g., maximize) throughput of the granular material 103.

The computing system 170 may also or instead determine that the measured pressure 420 is increasing and/or has exceeded the target pressure range 440. This may indicate that the amount of granular material 103 passing through the pumps 120A-120D and/or entering the transfer pipes 140A-140D is increasing. In response to determining that the measured pressure 420 is increasing and/or has exceeded the target pressure range 440, the computing system 170 may increase the speed of the pumps 120A-120D. This may increase (e.g., maximize) throughput of the granular material 103 and/or cause the blower pressure 420 decrease back into the target pressure range 440.

The computing system 170 may also or instead determine that the measured pressure 420 is decreasing and/or has fallen below the target pressure range 440. This may indicate that the granular material 103 has stopped passing through the pumps 120A-120D and/or entering the transfer pipes 140A-140D. In response to determining that the measured pressure 420 is decreasing and/or has fallen below the target pressure range 440, the computing system 170 may wait a predetermined amount of time (e.g., 10 seconds) to confirm that the pressure measurement is accurate (e.g., not noise) and/or to determine whether the pressure corrects itself. After the predetermined amount of time, the computing system 170 may decrease the speed of the pumps 120A-120D. The pumps 120A-120D may be decelerated until the measured pressure 420 levels off or begins increasing again. In one embodiment, if the measured pressure 420 does not level off or begin increasing again, then the computing system 170 may decelerate the pumps 120A-120D down to the initial (e.g., baseline) speed.

In one embodiment, the computing system 170 may determine that the measured pressure 420 is within the predetermined pressure range 440 but has become unstable. As used herein, "unstable" refers to the measured pressure rapidly decreasing and increasing again (e.g., by greater than a predetermined amount) back to the target setpoint, in a cyclic manner. This may be due to the pump 120A-120D speed being too fast. In response, the computing system 170 may reduce the speed of the pumps 120A-120D until the measured pressure 420 becomes stable again.

Figure 5:
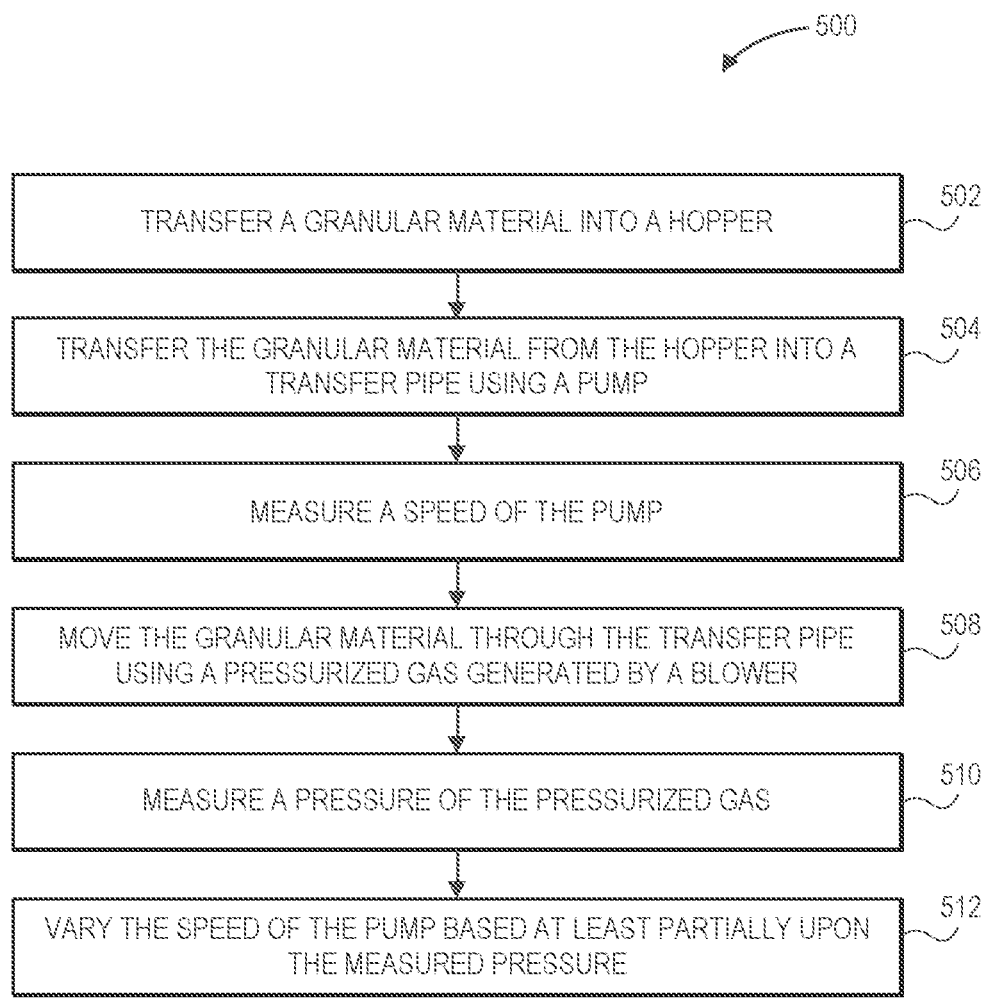
FIG. 5 illustrates a flowchart of a method for transporting and storing granular material, according to an embodiment.

FIG. 5 illustrates a flowchart of a method 500 for transporting and storing granular material 103, according to an embodiment. An illustrative order of the method 500 is provided below; however, one or more steps of the method 500 may be performed in a different order, combined, split into sub-steps, repeated, or omitted.

The method 500 may include transferring the granular material 103 into the hopper 110, as at 502. The granular material 103 may be transferred from the truck 102 into the hopper 110 using the conveyor 104.

The method 500 may also include transferring the granular material 103 from the hopper 110 into the transfer pipe(s) 140A-140D using the pump(s) 120A-120D, as at 504.

The method 500 may also include measuring the speed 410 of the pump(s) 120A-120D, as at 506. The speed 410 may be measured by the speed sensor(s) 160A. In one embodiment, the speed 410 of each pump 120A-120D may be measured independently using different speed sensors 160A.

The method 500 may also include moving the granular material 103 through the transfer pipe(s) 140A-140D using the blower(s) 130A-130D, as at 508. The blower(s) 130A-130D may generate a pressurized gas (e.g., air) that moves the granular material 103. The granular material 103 may be moved into the silo 150.

The method 500 may also include measuring the pressure 420 of the pressurized gas, as at 510. The pressure 420 may be measured by the pressure sensor(s) 160B. In one embodiment, the pressure 420 of each blower 130A-130D may be measured independently using different pressure sensors 160B.

The method 500 may also include varying the speed 410 of the pump(s) 120A-120D based at least partially upon the measured pressure 420, as at 512. The speed of each pump (e.g., pump 120A) may be varied independently of the other pumps (e.g., pumps 120B-120D) based at least partially upon the measured pressure 420 in its corresponding blower (e.g., blower 130A). In one embodiment, varying the speed 410 may include increasing the speed 410 of the pump(s) 120A-120D based at least partially upon the measured pressure 420 being within the predetermined range 440. In another embodiment, varying the speed 410 may include increasing the speed 410 of the pump(s) 120A-120D based at least partially upon the measured pressure 420 exceeding the predetermined range 440. In another embodiment, varying the speed 410 may include decreasing the speed of the pump(s) 120A-120D based at least partially upon the measured pressure 420 falling below the predetermined range 440. In another embodiment, varying the speed may include decreasing the speed 410 of the pump(s) 120A-120D based at least partially upon the measured pressure 420 being within the predetermined range 440 and unstable.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." As used herein, the term "about" refers to a +/−10% variation from the cited value.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for transporting and storing a granular material, the system comprising:
   a conveyor configured to transfer the granular material from a truck into a hopper;
   a pump configured to transfer the granular material out of the hopper into a transfer pipe, wherein the pump comprises:
   an upstream portion having an upstream helical flight; and
   a downstream portion having a downstream helical flight, wherein an outer diameter of the downstream helical flight is from about 0.01 inches to about 0.10 inches less than an outer diameter of the upstream helical flight, wherein a gap between the outer diameter of the downstream helical flight and an auger housing is from about 0.01 inches to about 0.10 inches greater than a gap between the outer diameter of the upstream helical flight and the auger housing, wherein a thickness of the downstream helical flight is from about 0.05 inches to about 0.40 inches less than a thickness of the upstream helical flight, and wherein a surface of the downstream portion has a lesser coefficient of friction than a surface of the upstream portion;

a speed sensor configured to measure a speed of the pump;

a blower configured to generate pressurized air that moves the granular material within the transfer pipe;

a pressure sensor configured to measure a pressure of the pressurized air; and a silo configured to receive the granular material from the transfer pipe.

2. The system of claim 1, wherein the downstream portion comprises a tailpiece that is configured to be positioned at least partially around a shaft of the upstream portion.

3. The system of claim 1, wherein a speed of the blower is from about 2500 rotations per minute (RPM) to about 3000 RPM.

4. The system of claim 1, wherein the computing system is also configured to decrease the speed of the pump in response to the measured pressure being within the predetermined range and unstable.

5. The system of claim 1, wherein the system is located at a well site, and wherein the granular material comprises sand that is configured to be used in hydraulic fracturing operations at the wellsite.

6. A system, comprising:

a pump configured to transfer a granular material out of a hopper into a transfer pipe, wherein the pump comprises an upstream portion having an upstream helical flight and a downstream portion having a downstream helical flight, wherein the downstream portion comprises a tailpiece, and wherein:

an outer diameter of the downstream helical flight is less than an outer diameter of the upstream helical flight, a gap between the outer diameter of the downstream helical flight and an auger housing is greater than a gap between the outer diameter of the upstream helical flight and the auger housing, a thickness of the downstream helical flight is from about 0.05 inches to about 0.40 inches less than a thickness of the upstream helical flight, and a surface of the downstream portion has a lesser coefficient of friction than a surface of the upstream portion.

7. The system of claim 6, wherein the outer diameter of the downstream helical flight is from about 0.01 inches to about 0.10 inches less than the outer diameter of the upstream helical flight.

8. The system of claim 6, wherein the gap between the outer diameter of the downstream helical flight and the auger housing is from about 0.01 inches to about 0.10 inches greater than a gap between the outer diameter of the upstream helical flight and the auger housing.

9. The system of claim 6, further comprising a blower configured to generate pressurized gas that moves the granular material within the transfer pipe into a silo.

10. The system of claim 9, further comprising:

a speed sensor configured to measure a speed of the pump; and a pressure sensor configured to measure a pressure of the pressurized gas.

11. The system of claim 10, wherein the computing system is also configured to increase the speed of the pump in response to the measured pressure exceeding the predetermined range.

12. The system of claim 10, wherein the computing system is also configured to decrease the speed of the pump in response to the measured pressure falling below the predetermined range.

13. The system of claim 10, wherein the computing system is also configured to decrease the speed of the pump in response to the measured pressure being within the predetermined range and unstable.

14. A method for transporting and storing a granular material, the method comprising:

transferring the granular material from a truck into a hopper;

transferring the granular material from the hopper into a transfer pipe using a pump, wherein the pump comprises an upstream portion having an upstream helical flight and a downstream portion having a downstream helical flight, and wherein:

a thickness of the downstream helical flight is from about 0.05 inches to about 0.40 inches less than a thickness of the upstream helical flight, or a surface of the downstream portion has a lesser coefficient of friction than a surface of the upstream portion;

moving the granular material through the transfer pipe and into a silo using a blower, wherein the blower generates a pressurized gas to move the granular material;

measuring a pressure of a pressurized gas using a pressure sensor; and varying a speed of the pump based at least partially upon the measured pressure.

15. The method of claim 14, wherein varying the speed of the pump comprises maintaining or increasing the speed of the pump based at least partially upon the measured pressure being within a predetermined range.

16. The method of claim 14, wherein varying the speed of the pump comprises increasing the speed of the pump based at least partially upon the measured pressure exceeding a predetermined range.

17. The method of claim 14, wherein varying the speed of the pump comprises decreasing the speed of the pump based at least partially upon the measured pressure falling below a predetermined range.

18. The method of claim 14, wherein varying the speed of the pump comprises decreasing the speed of the pump based at least partially upon the measured pressure being within a predetermined range and unstable.

19. A system, comprising:

a pump configured to transfer a granular material out of a hopper into a transfer pipe, wherein the pump comprises an upstream portion having an upstream helical flight and a downstream portion having a downstream helical flight, and wherein:

a thickness of the downstream helical flight is from about 0.05 inches to about 0.40 inches less than a thickness of the upstream helical flight, or a surface of the downstream portion has a lesser coefficient of friction than a surface of the upstream portion.

\* \* \* \* \*